United States Patent
Zhang et al.

(10) Patent No.: US 11,438,919 B2
(45) Date of Patent: Sep. 6, 2022

(54) TDD SINGLE TX SWITCHED UL SOLUTION

(71) Applicant: Apple Inc., Cupertino, CA (US)

(72) Inventors: Dawei Zhang, Saratoga, CA (US); Fangli Xu, Beijing (CN); Haijing Hu, Beijing (CN); Haitong Sun, Irvine, CA (US); Wei Zeng, San Diego, CA (US); Yuchul Kim, Santa Clara, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 16/950,608

(22) Filed: Nov. 17, 2020

(65) Prior Publication Data

US 2021/0076400 A1 Mar. 11, 2021

Related U.S. Application Data

(63) Continuation of application No. 16/386,529, filed on Apr. 17, 2019, now Pat. No. 10,880,917.

(Continued)

(51) Int. Cl.
| | |
|---|---|
| *H04W 72/12* | (2009.01) |
| *H04L 5/14* | (2006.01) |
| *H04W 72/04* | (2009.01) |
| *H04L 1/18* | (2006.01) |
| *H04L 5/00* | (2006.01) |
| *H04W 80/08* | (2009.01) |

(Continued)

(52) U.S. Cl.
CPC ....... *H04W 72/1268* (2013.01); *H04L 1/1819* (2013.01); *H04L 5/0051* (2013.01); *H04L 5/0055* (2013.01); *H04L 5/1469* (2013.01); *H04L 25/0226* (2013.01); *H04L 27/2607* (2013.01); *H04W 72/0446* (2013.01); *H04W 74/0833* (2013.01); *H04W 76/27* (2018.02); *H04W 80/08* (2013.01)

(58) Field of Classification Search
CPC ............. H04W 72/1268; H04W 76/27; H04W 72/0446; H04W 74/0833; H04W 80/08; H04L 1/1819; H04L 5/0051; H04L 5/1469; H04L 25/0226; H04L 27/2607
See application file for complete search history.

(56) References Cited

U.S. PATENT DOCUMENTS

| | | |
|---|---|---|
| 4,924,236 A | 5/1990 | Schuss |
| 9,532,369 B2 | 12/2016 | Susitaival |

(Continued)

FOREIGN PATENT DOCUMENTS

| | | |
|---|---|---|
| CA | 2186031 A1 | 9/1995 |
| CN | 103944668 A | 7/2014 |

(Continued)

OTHER PUBLICATIONS

International Search Report and Written Opinion, Application No. PCT/US2018/028684, dated Jul. 17, 2018, 14 pages.

(Continued)

*Primary Examiner* — Duc C Ho
(74) *Attorney, Agent, or Firm* — Kowert, Hood, Munyon, Rankin & Goetzel, P.C.

(57) ABSTRACT

Apparatuses, systems, and methods for time division multiplexing of uplink communications using a first wireless link with a first radio access technology (RAT) and a second wireless link with a second RAT.

20 Claims, 15 Drawing Sheets

Related U.S. Application Data

(60) Provisional application No. 62/683,112, filed on Jun. 11, 2018.

(51) Int. Cl.
*H04L 25/02* (2006.01)
*H04W 74/08* (2009.01)
*H04W 76/27* (2018.01)
*H04L 27/26* (2006.01)

(56) References Cited

U.S. PATENT DOCUMENTS

| | | | |
|---|---|---|---|
| 9,723,626 | B2 | 8/2017 | Golitschek Edler Von Elbwart et al. |
| 2009/0274078 | A1 | 11/2009 | Zhao |
| 2013/0201969 | A1 | 8/2013 | Liu et al. |
| 2013/0301490 | A1 | 11/2013 | He |
| 2014/0204807 | A1 | 7/2014 | Li et al. |
| 2014/0247759 | A1 | 9/2014 | Zhang et al. |
| 2015/0358998 | A1 | 12/2015 | Golitschek Edler Von Elbwart |
| 2015/0372798 | A1 | 12/2015 | Zhao |
| 2016/0242202 | A1 | 8/2016 | Matin et al. |
| 2016/0255639 | A1 | 9/2016 | Chen et al. |
| 2017/0265205 | A1* | 9/2017 | HomChaudhuri .. H04W 72/042 |
| 2017/0295589 | A1* | 10/2017 | Sundararajan .......... H04L 25/08 |
| 2017/0332359 | A1 | 11/2017 | Tsai et al. |
| 2018/0167965 | A1 | 6/2018 | Wang |
| 2018/0220434 | A1 | 8/2018 | Takeda et al. |
| 2018/0270682 | A1 | 9/2018 | Zacharias et al. |
| 2018/0279304 | A1 | 9/2018 | Lee et al. |
| 2018/0279400 | A1 | 9/2018 | Faccin et al. |
| 2018/0309513 | A1 | 10/2018 | Kim |
| 2018/0367289 | A1 | 12/2018 | Kim |
| 2019/0229837 | A1 | 7/2019 | Li et al. |
| 2020/0092880 | A1 | 3/2020 | Choi et al. |

FOREIGN PATENT DOCUMENTS

| | | |
|---|---|---|
| CN | 104285392 A | 1/2015 |
| CN | 104885389 A | 9/2015 |
| EP | 0279050 A1 | 12/1987 |
| EP | 1248479 A2 | 9/2002 |
| EP | 2955966 A1 | 12/2015 |
| EP | 3171561 A1 | 5/2017 |
| EP | 3185361 A1 | 6/2017 |
| JP | 2016511558 A | 4/2016 |
| KR | 20150107750 A1 | 9/2015 |
| WO | 2016003173 A1 | 1/2016 |
| WO | 2017026400 A1 | 2/2017 |
| WO | 2017032408 A1 | 3/2017 |
| WO | 2017035300 A1 | 3/2017 |
| WO | 2017166195 A1 | 10/2017 |

OTHER PUBLICATIONS

Written Opinion, Application No. PCT/US2018/028684, dated Apr. 1, 2019, 11 pages.

Intel Corporation: "Group Common PDCCH"; R1-1702219; 3GPP Draft; 3rd Generation Partnership Project (3GPP), Mobile Competence Centre, 650, Route Des Lucioles, F-06921 Sophia-Antipolis Cedex, France; vol. Ran WG1, No. Athens, Greece: Feb. 12, 2017; four pages.

CMCC; "Discussion on semi-static TDD configurations"; 3GPP Draft; RI-1703410; 3rd Generation Partnership Project (3GPP); vol. RAN WG1, No. Athens, Greece; Feb. 12, 2017; four pages.

CMCC; "Discussion on the semi-static DL and UL transmission"; 3GPP Draft; RI-1708394; 3rd Generation Partnership Project (3GPP); vol. RAN WG1, No. Hangzhou; May 14, 2017; three pages.

International Search Report and Written Opinion, Application No. PCT/US2018/033778, dated Oct. 4, 2018, 14 pages.

CATT "Outstanding aspects of slot formal indication"; 3GPP TSG RAN WG1 Meeting AH_#NR3 R1-1715815; Nagoya, Japan; 10 pages; Sep. 18-21, 2017.

Intel Corp. "NR Group Common PDCCH"; 3GPP RSG RAN WG1 #88bis R1-1704745; Spokane, USA; 4 pages; Apr. 3-7, 2017.

Qualcomm Inc "Contents of group common PDCCH"; 3GPP TSG RAN WG1 #88bis R1-1705604; Spokane, USA; 6 pages; Apr. 3-7, 2017.

Office Action for Korean Patent Application No. 10-2019-7032574; 24 pages; dated Dec. 8, 2020.

First Office Action for Chinese Patent Application No. 2018800394620; dated Sep. 28, 2021.

Qualcomm Inc "NR LTE Adjacent Channel Coexistence Consideration"; 3GPP TSG RAN WG1 RAN1 NR BIS R1-1705642; Spokane, USA; 5 Pages; Apr. 3-7, 2017.

VIVO "Design of group-common PDCCH"; 3GPP TSG RAN WG1 NR Meeting 90bis R1-1717485; 10 pages; Oct. 9-13, 2017.

Qualcomm Inc "Remaining issues for slot format indication"; 3GPP TSG RAN WG1 #92 R1-1802835; Athens, Greece; 17 pages; Feb. 26-Mar. 2, 2018.

Huawei et al. "Overview of 5G frame structure"; 3GPP TSG RAN WG1 Meeting #84bis R1-162157; Busan, Korea; 6 pages; Apr. 11-15, 2016.

"The Study of Radio Resource Management Technology based on Carrier Aggregation for LTD-Advanced Systems"; Beijing University of Posts and Telecommunications; Dec. 2, 2013.

Sun et al. "Traffic Adaptation for Small Cell Networks with Dynamic TDD"; 2016 IEEE Global Communications Conference; Globecom 2016; Dec. 2016.

\* cited by examiner

| Type | IE | eIMTA Usage | Single Tx Switch UL Usage |
|---|---|---|---|
| SIB1 | subframeAssignment | UL scheduling and HARQ Timing; RRM/RLM measurement; fallback config | Configure the TDD configuration for (1) Legacy UE (2) UL HARQ time line |
| RRC | Eimta-HARQ-ReferenceConfig-r12 | DL HARQ timing | Configure the TDD configuration for DL HARQ time line |
| L1 Configuration | DCI | For dedicated transmission, PDCCH monitoring, and CSI measurement | NA |

FIG. 13

| | k | \multicolumn{10}{c}{Subframe Number n} |
|---|---|---|---|---|---|---|---|---|---|---|---|

| | k | 0 | 1 | 2 | 3 | 4 | 5 | 6 | 7 | 8 | 9 |
|---|---|---|---|---|---|---|---|---|---|---|---|
| 1601 | DCI to PUSCH timing (Table 8-2 36.213) | 7 | 7 | | | | 7 | 7 | | | 5 |
| | PUSCH to PICH timing (Table 8.3-1 36.213) | 6 | 4 | | | | 7 | 4 | | | 6 |
| Mod 1 | DCI to PUSCH timing (Table 8-2 36.213) | 4 | 6 | | | | 3 | 6 | | | 4 |
| Mod 2 | DCI to PUSCH timing (Table 8-2 36.213) | 4 | 6 | | | | 13 | 6 | | | 4 |
| Mod 3 | DCI to PUSCH timing (Table 8-2 36.213) | 14 | 16 | | | | 13 | 16 | | | 14 |

TDD SINGLE TX SWITCHED UL SOLUTION

PRIORITY CLAIM

This application is a continuation of U.S. patent application Ser. No. 16/386,529, entitled "TDD Single Tx Switched UL Solution," filed Apr. 17, 2019, now U.S. Pat. No. 10,880,917, issued Dec. 29, 2020, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform attachment of a wireless device to concurrent (or substantially concurrent) connections with two (or more) different radio access technologies (RAT). For example, the wireless device may perform attachment and/or other communications with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first RAT and the second radio may be configured to perform cellular communication according to a second RAT.

In some embodiments, a network element may be configured to perform methods to establish a first wireless link with a wireless device according to a first RAT and establish a second wireless link with wireless device according to a second RAT. Further, the network element may be configured to schedule uplink activity for both the first RAT and the second RAT by time division multiplexing (TDM) (e.g., or time division duplexing (TDD)) uplink data for the first RAT and uplink data for the second RAT, according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 13 illustrates example mechanisms for configuring a TDD schedule for Evolved Universal Mobile Telecommunications System (UMTS) Terrestrial Radio Access (EU-TRA)—New Radio Dual Connectivity (EN-DC), according to some embodiments.

FIG. 16 illustrates example HARQ timing modifications, according to some embodiments.

Figure 1:
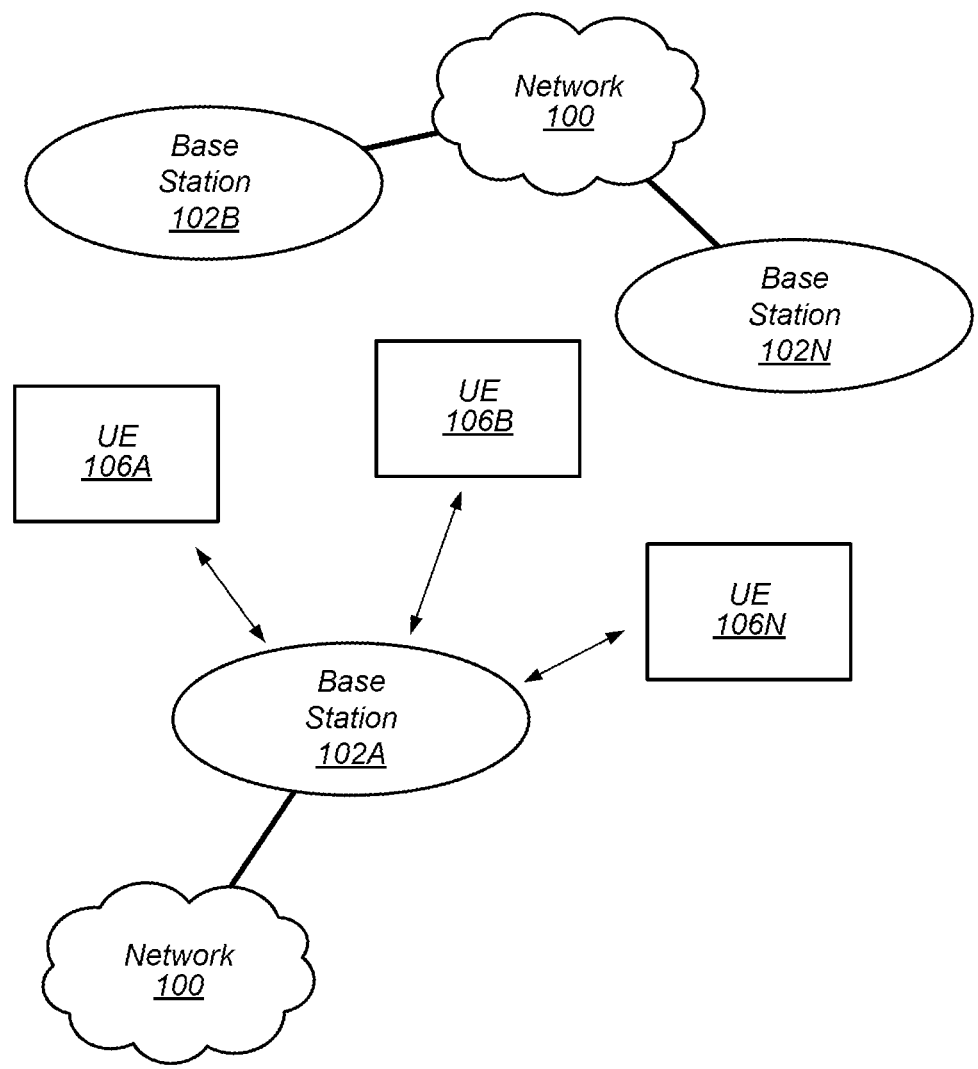
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
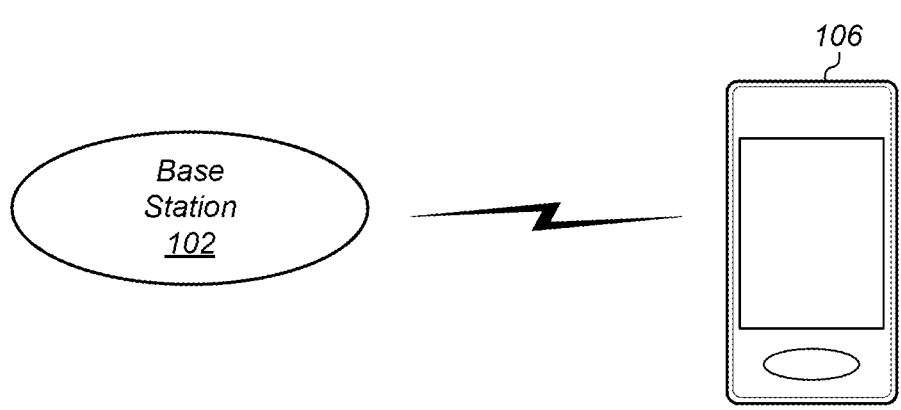
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
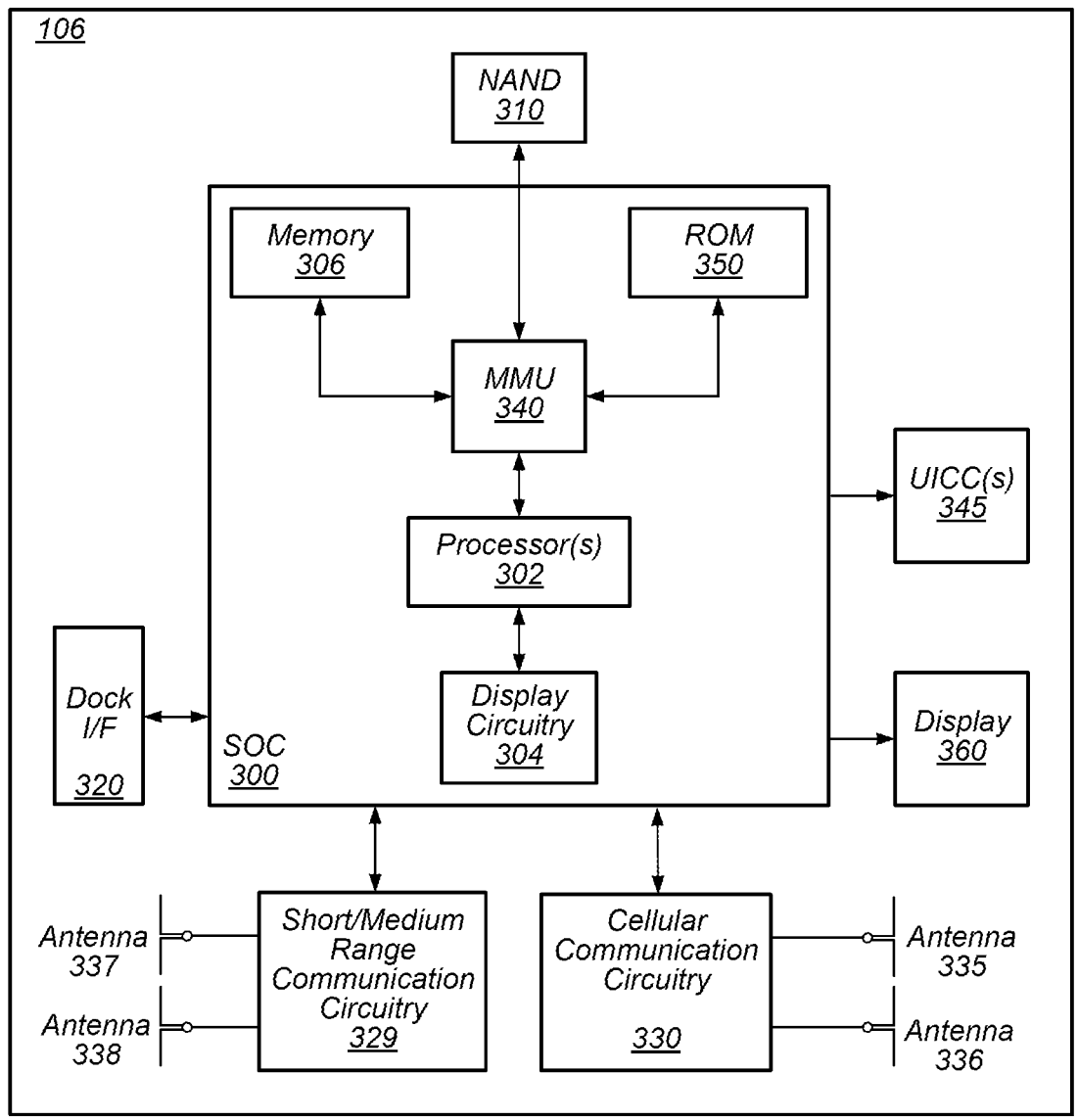
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node (e.g., a network element, e.g., a base station) operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR (e.g., EN-DC) operations. The processor(s) 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
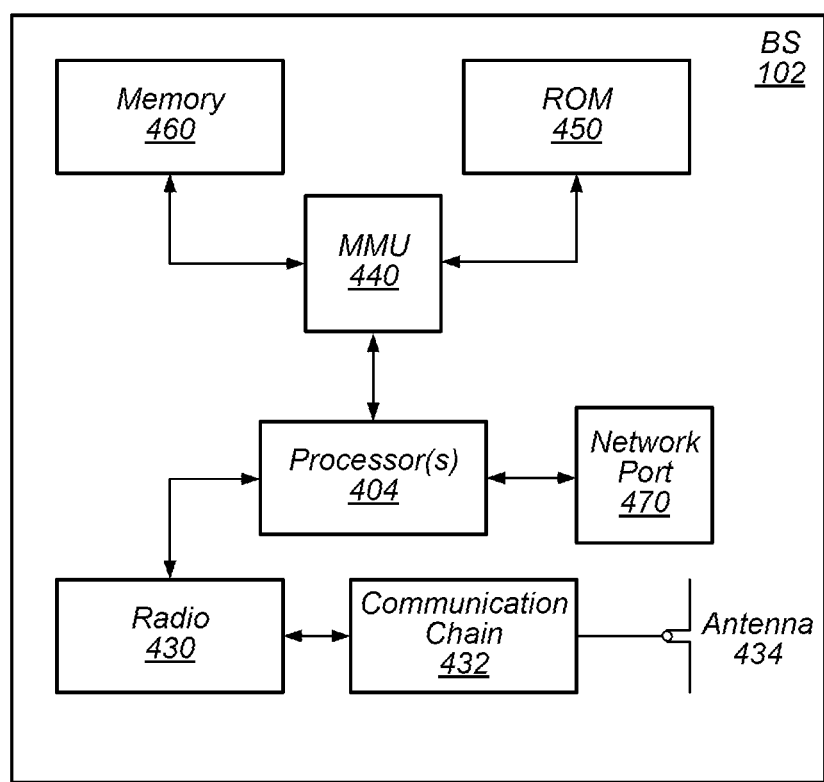
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
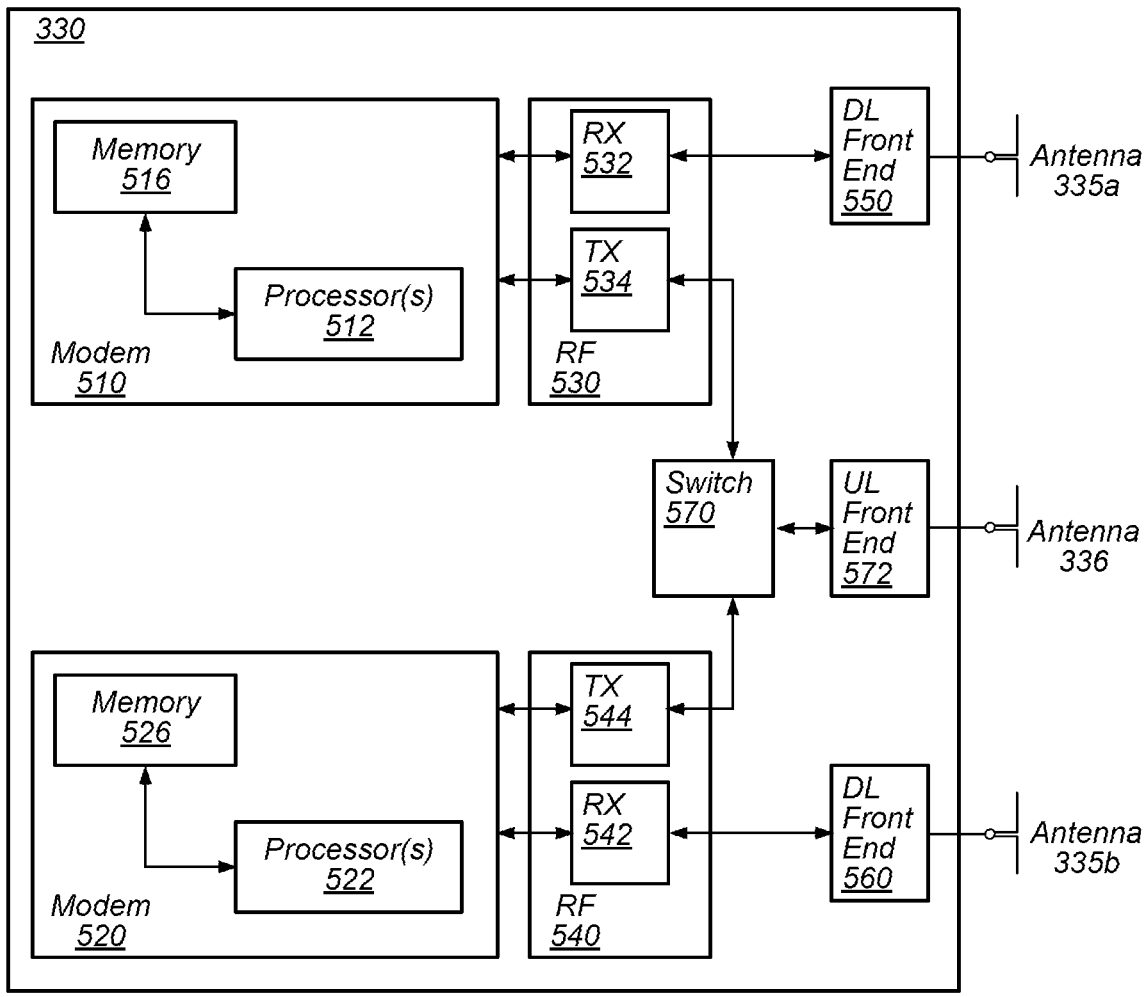
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

5G NR Non-Standalone (NSA) Operation with LTE

Figure 6A:
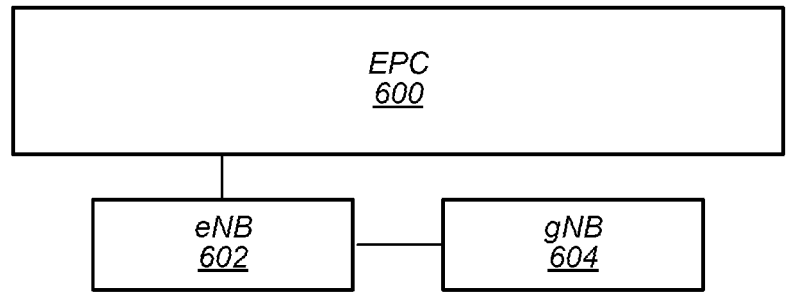
FIG. 6A illustrates an example of connections between an EPC network, an LTE base station (eNB), and a 5G NR base station (gNB).
Figure 6B:
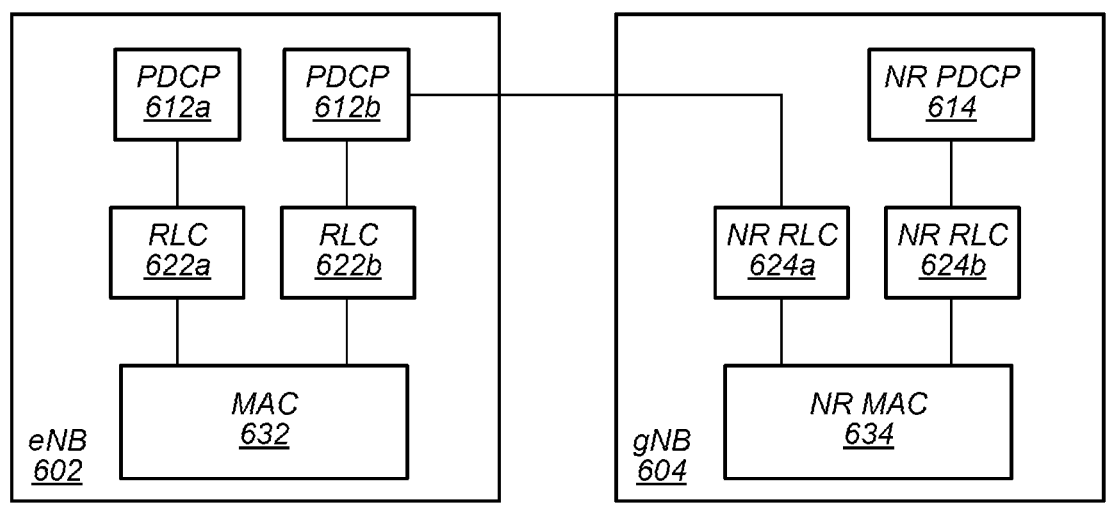
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. LTE and 5G NR dual connectivity may be referred to as in EUTRA-NR Dual Connectivity (EN-DC). Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, in some embodiments, LTE may be used for control plane signaling and NR may be used for user plane signaling. Thus, LTE may be used to establish connections to the network and NR may be used for data services.

FIG. 6B illustrates a possible protocol stack for eNB 602 and gNB 604; other protocol stacks are possible. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

TDM Transmission for Inter-RAT Dual Connectivity

In some embodiments, a UE, such as communication device 106, may use a single UL RF chain for 5G NR and LTE bands, e.g., via cellular communication circuitry 330 as illustrated by FIG. 5 above. In some embodiments, the UE may support two (e.g., or more) downlink RF chains for concurrent (or substantially concurrent) DL operations in 5G NR and LTE, e.g., via cellular communication circuitry 330 as illustrated by FIG. 5 above. In some embodiments, an LTE cell, such as eNB 602, may not support LTE/NR co-existence on the same carrier, thus, time division multiplexing (TDM) may occur on different frequencies. In some embodiments, an LTE cell, such as eNB 602, may support LTE/NR co-existence on the same carrier, thus TDM may occur on the same frequencies. In some embodiments, TDM for UL transmissions may occur at a physical layer of a protocol stack.

Figure 7:
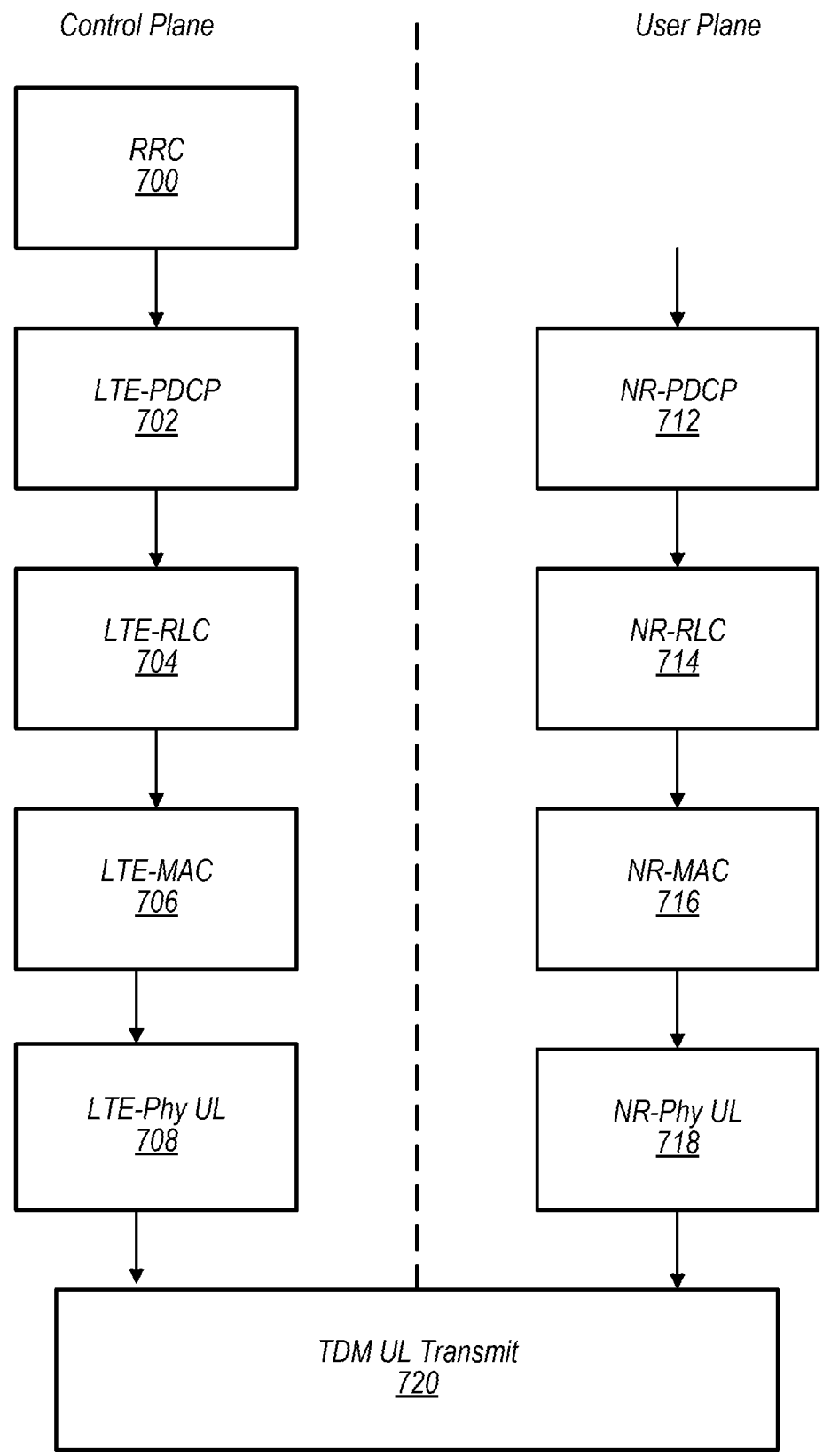
FIG. 7 illustrates an example of control and user planes, according to some embodiments.

For example, FIG. 7 illustrates an example of an LTE control plane and an NR user plane for TDM for UL transmissions, according to some embodiments. As shown, in some embodiments, a control plane may include a radio resource control (RRC) layer 700, an LTE packet data convergence protocol (PDCP) layer 702, an LTE radio link control (RLC) layer 704, and LTE medium access control (MAC) layer 706, and an LTE physical uplink (Phy UL) layer 708. In addition, a user plane may include an NR-PDCP layer 712, and NR-RLC layer 714, and NR-MAC layer 716, and a NR-Phy UL layer 718. Thus, LTE may be used for control and/or connection signaling (e.g., via RRC layer 700) as well as data signaling whereas NR may be used for data signaling. In some embodiments, the UL data subframes, e.g., as further described below, may be time division multiplexed (TDM) at the UL physical layer, e.g., as shown by TDM UL transmit 720. In some embodiments, if an LTE cell (or base station) does not support LTE/NR co-existence on a single carrier, the TDM at the UL physical layer may be on different frequencies. In some embodiments, if an LTE cell (or base station) does support LTE/NR co-existence on a single carrier, the TDM at the UL physical layer may be on the same frequency.

As noted above, an $X_2$ interface may allow for communication between an LTE base station, e.g. such as eNB 602, and a 5G NR base station, e.g., such as gNB 604. In particular, in some embodiments, the $X_2$ may allow for the LTE-PDCP layer 702 of the control plane to exchange communications with the NR-RLC layer 714 of the user plane. In some embodiments, synchronization (e.g., allocation of subframes) between an LTE base station and a NR base station may be enabled via the $X_2$ interface. Note that these allocations, which may be semi-static resource allocations, may be exchanged to coordinate the eNB and gNB. For example, in LTE, certain UL resources are semi-statically reserved and/or configured, including sounding reference signals (SRS), physical uplink control channel (PUCCH), and physical random access channel (PRACH), among other channels and resources. In addition, a similar semi-static allocation approach may be adopted for NR. Thus, to avoid conflicting usage of the semi-statically reserved resources, the eNB and gNB may exchange configurations via the $X_2$ interface.

In some embodiments, a radio frame (e.g., for LTE and/or NR) may have a duration of 10 ms. Each frame may be divided into 10 subframes (SF), each with a duration of 1 ms. Each subframe may contain two 0.5 ms slots, and each slot may contain a number of symbols. In some embodiments, NR symbols may have a shorter duration, e.g., half the duration, of LTE symbols. Thus, an LTE/NR slot may contain 7 LTE symbols or 14 NR symbols, among various possibilities.

In some embodiments, single transmission (Tx) switched uplink operation (SUO) may be performed in EUTRA-NR Dual Connectivity (EN-DC). In some embodiments, the UL TDM pattern may be as specified per R4-1805323. In some embodiments, the UL TDM may be based on LTE's enhanced Interference Mitigation and Traffic Adaptation (eIMTA), e.g., to reserve a subset of available UL SFs for LTE. In some embodiments, UL TDM may be implemented dynamically. As a per-band combination (BC) UE capability, a UE may signal support for SUO for a given EN-DC band or combination of bands. If dual transmission is scheduled instead of SUO, the UE behavior may be configured as desired. For example, band 41 may be a time division duplex (TDD) band, and thus may allow single Tx SUO for intra-band EN-DC.

Figure 8:
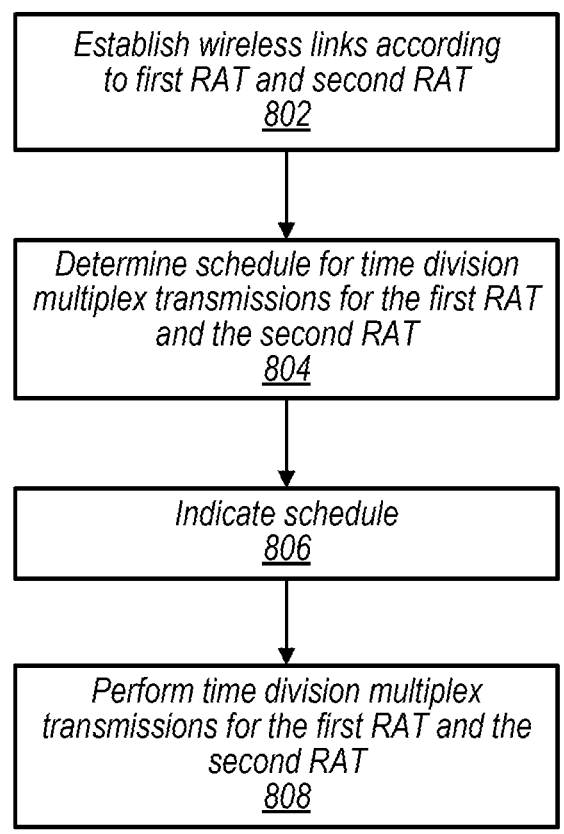
FIG. 8 illustrates a block diagram of an example of a method for using time division multiplexing (TDM) to support inter-RAT dual connectivity (DC), according to some embodiments.

FIG. 8 is a flow chart illustrating a method for TDD uplink activity in EN-DC. Aspects of the method of FIG. 8 may be implemented by an element (or elements) of a network in communication with a wireless device, such as the UEs 106 illustrated in and described with respect to FIGS. 1-7, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.) or base station (e.g., processor(s) 404, or a processor associated with radio 430 and/or communication chain 432, among various possibilities) may cause the UE or base station (respectively) to perform some or all of the illustrated method elements. Similarly, a processor of another network element may be configured to perform (e.g., and/or cause a base station to perform) some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. Although the method may be illustrated and described in terms of TDM scheduling, it will be appreciated that aspects of the method may also be applied to FDM scheduling, among various possibilities. Similarly, the method may be applied to downlink scheduling as well as, or instead of uplink scheduling. As shown, the method may operate as follows.

A network element (e.g., a base station, gNB, eNB, and/or any of various network functions) may establish a first wireless link with a wireless device (e.g., a UE 106) according to a first radio access technology (RAT) and establish a second wireless link with the wireless device according to a second RAT (802). The wireless links may be cellular links, e.g., one of the links may be an LTE (e.g., or LTE-A) link and the other may be a 5G NR link, among various possibilities. Additional wireless links may be established as desired, e.g., over additional RATs or over one or both of the first and second RAT. The network element may operate in coordination with one or more other network elements to establish the wireless links. For example, the network element may establish an LTE link using an eNB and an NR link using a gNB. In some embodiments, the UE may be limited in its uplink (UL) capabilities, e.g., the UE may only be able to transmit uplink communications on one of the wireless links at a time, e.g., as described above. Accordingly, it may be necessary for the network element (and/or the UE or base station) to determine a TDM (e.g., or time division duplexing (TDD)) schedule for UL transmissions of the UE.

The network element may determine a TDM schedule for the RATs (804). The TDM schedule may allow the UE to perform uplink transmissions on each RAT at separate times, e.g., the UL transmissions on the first RAT may be scheduled at a first time or times and on the second RAT at a second time or times. In other words, the network element may coordinate the activities (e.g., UL transmissions, etc.) of the first RAT and the second RAT. In some embodiments, the TDM schedule may designate times for DL communications, e.g., at the same or different times than UL communications, e.g., DL communications on the RATs may or may not be concurrent with each other or with UL communications.

In some embodiments, the TDM schedule may include reallocating (e.g., adjusting the schedule of) certain activities (e.g., a UL or DL transmission, subframe, etc.) on one RAT in order to make time/resources available for UL transmissions on another RAT. For example, LTE may include various TDD configurations for subframes within a radio frame. In order to make time available for NR uplink transmissions (e.g., using the same antenna or transmit chain), the schedule may involve adjusting, modifying, or manipulating these configurations so that some time is available for LTE UL transmissions and other time is available for NR UL transmissions, e.g., within the same frame. For example, an LTE activity, such as an LTE UL transmission may be reallocated from a first time to a second time so that the first time may be available for NR UL. Similarly, a time (or times) allocated for LTE UL activity may be reallocated for NR UL activity. In other words, a first LTE schedule, e.g., a "base" or "starting" schedule may be adjusted to a "modified" schedule that allows time for NR UL. NR UL activities may be scheduled in the TDM schedule in the time allowed.

In some embodiments, some LTE TDD configurations may include different types of subframes (SF), including DL SFs, UL SFs, and "special" (sometimes abbreviated as "S") SFs. Some or all symbols of a special subframe may be made available for NR UL activity. A special subframe (e.g., of LTE) may include Downlink Pilot Time Slot (DwPTS), guard period (GP), and Uplink Pilot Time Slot (UpPTS). For example, all or part of the UpPTS may be made available for NR UL by rescheduling the sounding reference signal (SRS) and/or any other transmissions scheduled during the UpPTS. SRS may be located in only a portion of the symbols of UpPTS (e.g., in a last symbol of UpPTS) or may be relocated to a different subframe. For example, the SRS (e.g., and/or other transmissions, e.g., Physical Random Access Channel (PRACH)) may be rescheduled to a later UL SF, e.g., along with other (e.g., LTE) UL transmissions. Further, all or a portion of the GP may be made available for NR UL transmissions, e.g., without rescheduling any LTE transmissions, e.g., because no LTE transmissions occur during the GP, according to some embodiments. In some embodiments, all or a portion of the DwPTS may be used for NR UL transmissions.

In some embodiments, LTE subframes (e.g., entire SFs) may be reallocated for NR UL transmissions. For example, enhanced Interference Mitigation and Traffic Adaptation (eIMTA) techniques may allow for dynamic adaptation of LTE TDD configurations, e.g., using semi-static UL resource partitions. eIMTA techniques may be adapted to allocate (e.g., reallocate) subframes of LTE TDD configurations for NR UL transmissions. For example, an uplink subframe (e.g., according to a first TDD configuration) may be reallocated as a DL subframe (e.g., according to a second TDD configuration), then, the subframe may be used for NR UL transmissions (e.g., no DL transmissions may be scheduled for the subframe). In other words, a network element may convert a subframe (or subframes) scheduled for LTE UL to NR UL. This conversion may be implemented by selecting an LTE TDD configuration that includes DL subframes, avoiding scheduling DL transmission during a DL subframe (or subframes) intended for NR UL, and scheduling NR UL activity during the intended subframe(s). Further, the network may also (or alternatively) convert LTE special or DL subframes to NR UL in a similar manner.

In some embodiments, HARQ timing may be adjusted so that HARQ retransmissions are not interrupted by the (e.g., adjusted) TDM schedule. Such adjustments may be viewed as an enhancement to the TDM schedule, e.g., adjustments to the HARQ timing may be used to avoid negative consequences (e.g., to the HARQ process) due to use of a modified TDM schedule. For semi-static UL SF partition between LTE and NR, the subset of UL SFs may be self-contained in terms of HARQ re-transmission, e.g., the HARQ retransmission may happen within the subset. Each UL SF may be self-contained for LTE TDD configurations 1, 2, 3, 4 and 5. That is, for a PUSCH transmission in SFi, the retransmission may also happen in SFi, e.g., in a later frame. However, LTE TDD configurations 0 and 6 may not be self-contained. For example, for configuration 6, the pattern of retransmissions may be: SF2→SF3→SF4→SF7→SF8→SF2, etc. (e.g., a transmission in SF 2 may be retransmitted (e.g., if needed) in SF 3, etc.). To address this issue, the HARQ timing for TDD configurations 0 and/or 6 may be adjusted, so that retransmission may happen at the same SF, for example after 10 ms and/or 20 ms, e.g., one and/or two frames later. Larger frame delays (e.g., three or more frames) are also possible.

In some embodiments, HARQ timing may be adjusted using a HARQ offset, e.g., for TDD DL HARQ operation. The HARQ offset may not change any subframe or slot number. In other words, the offset may cause the HARQ feedback for a subframe of a first frame to occur in the same subframe of a later frame. The HARQ offset may operate as follows. If, before applying the offset, the HARQ feedback for DL SF number m was mapped to UL SF number n, then after the offset, the HARQ feedback for DL SF number (m+HARQ_offset) is mapped to UL SF number (n+HARQ_offset). Such an offset may make one subframe (e.g., previously an LTE UL SF, e.g. SF n) available for NR UL, e.g., and may result in a second subframe (e.g., previously an LTE DL SF, e.g., SF n+HARQ_offset) being used as an LTE UL SF. The offset may be configured so that the same offset is applied to a data subframe index and a corresponding HARQ feedback subframe index. In other words, if a DL SF number (m) is mapped to UL SF number (n), then after the offset, DL SF number (m+HARQ_offset) may be mapped to UL SF number (n+HARQ_offset).

In some embodiments, the techniques for allocating time in the TDM schedule for NR UL transmissions may be combined in various ways, as desired. For example, within one or more frames, NR UL transmissions may be scheduled during one or more special subframes, during one or more UL subframes, or any combination of subframes. HARQ schedules may (or may not) be adjusted as a result of the schedule. For example, if NR UL transmissions are only scheduled during LTE special subframes, no adjustments to the HARQ schedule may be necessary, e.g., because no LTE UL transmissions that would lead to a HARQ acknowledgement may occur in special subframes (e.g., the only LTE UL transmission during a special subframe may be SRS, which may not be acknowledged). Similarly, in certain TDD configurations (e.g., 1-5), UL SFs may be self-contained (e.g., if transmission occurs in SF i, retransmission will also occur in SF i), and thus no adjustments to the HARQ schedule may be necessary (e.g., even if an LTE UL SF is reallocated for NR UL activity.

In some embodiments, the specific time(s) made available for UL activities on the various RATs may be selected based on any of various factors. For example, the network element (and/or UE) may consider the type(s) and/or amount of traffic being exchanged on LTE and NR, e.g., particularly the uplink traffic. For example, UL and/or DL buffer status of either or both RATs may be considered, e.g., if the NR UL buffer is relatively full, the TDM schedule may allocate (or reallocate) relatively more time for NR UL transmissions; conversely, if the LTE UL buffer is relatively full, the TDM schedule may allocate relatively less time for NR UL transmissions. Further, if UL traffic of one RAT is relatively more urgent (e.g., based on service type, quality of service (QoS) class indicator (QCI), etc.), then relatively more time may be allocated to that RAT. For example, signaling data on LTE may be considered more urgent than best-effort application traffic NR or real-time traffic on one RAT may be considered more urgent than email traffic on a second RAT; UL time may be allocated to the more urgent traffic. Still further, the amount of DL data may be considered. For example, based on relatively full DL buffers of one or both RATs, less time may be allocated for UL activity of either or both RATs. Still further, UL time may be allocated based on channel conditions and/or network load conditions. For example, more time may be allocated to a RAT with worse channel conditions, e.g., so that UL traffic on that RAT can be transmitted at a lower code rate and may be more likely to be successfully received. As an alternative example, less UL time may be allocated to a RAT that is experiencing congestion and/or poor channel conditions, e.g., so that the UL traffic on that RAT may be transmitted at a later time so that load/conditions may improve. Still further, the UL times may be allocated considering the duration of different possible UL time allocation schemes in view of the way that different RATs may be able to use these durations. In some embodiments, (e.g., or under some conditions), no time may be made available for UL activity of one or more RATs. For example, in response to a determination that all UL activity on one RAT is lower priority and/or that there is less UL traffic in the buffer for one RAT, all time during one or more frames may be allocated to other activities (e.g., UL on the other RAT or DL on one or both RATs).

In some embodiments, in NR, transmissions of various types may have various lengths, can have various lengths. For example, a mini-slot or 2, 4, or 7 symbol duration may be used for a physical uplink shared channel (PUSCH) transmissions of data, among various possibilities. In some embodiments, other durations may be used for PUSCH transmissions. Notably, a mini-slot may be as short as one OFDM symbol and may start at any time. Similarly, a physical uplink control channel (PUCCH) transmission of control data may have various durations. For example, a short (e.g., 1-2 symbol) or long (4-14) symbol PUCCH may be used, among various possibilities.

The network element may transmit (e.g., cause a base station to transmit) an indication (or indications) of the TDM schedule to the UE (806). The indication may be transmitted in any of various ways. For example, the indication may be one or more messages. The indication may configure the UE to perform UL and DL communications at certain times, e.g., according to either or both RATs. The indication may configure or adjust the HARQ acknowledgement or negative acknowledgement (e.g., ACK or NACK, respectively) and/ or retransmission timing for UL and/or DL communications. The indication may include any number of system information block (SIB) messages, e.g., a SIB1. The indication may include one or more radio resource control (RRC) messages, e.g., an RRC configuration or reconfiguration message. The indication may include one or more other messages or message types. For example, the indication may include one or more uplink grants or subframe assignments. The indication may reconfigure a previous TDM schedule of one or both RATs. The indication may include or modify a configuration of a SRS and/or PRACH.

The indication may be transmitted over either or both of the RATs, or may be transmitted over a different RAT. One indication may be used to convey a schedule for a first RAT and a second indication may be used for a schedule of the second RAT. A first indication may indicate a starting or base schedule (e.g., for either or both RATs) and a later indication may indicate one or more modifications to the base schedule.

In some embodiments, a standing or default schedule may be used, e.g., for at least a first RAT, e.g., such a schedule may be defined by the first RAT, e.g., an LTE specified TDD configuration/schedule. Such a standing schedule may be set by a SIB1 message, among various possibilities. Deviations (e.g., modifications) from that schedule may be indicated at any time, e.g., in a later indication, e.g., by using an RRC message among various possibilities. Such modifications may be implemented to create time for UL transmissions on the second RAT in the modified schedule (e.g., if the standing schedule does not leave time available), or to increase or reduce the time available for UL transmissions on the second RAT (e.g., NR). Further, an indication of the schedule for the second RAT may be included in an indication of the modified schedule or in a separate indication, among various possibilities.

The UE and the network element may perform UL communications on the first and second RAT according to the TDM schedule (808). In particular, the UE may transmit UL communications on the first RAT at a first time (or times) as indicated by the schedule and UL communications on the second RAT at a second time (or times) as indicated by the schedule.

FIGS. 9-12—Exemplary TDD Structures and Subframes

Figure 9:
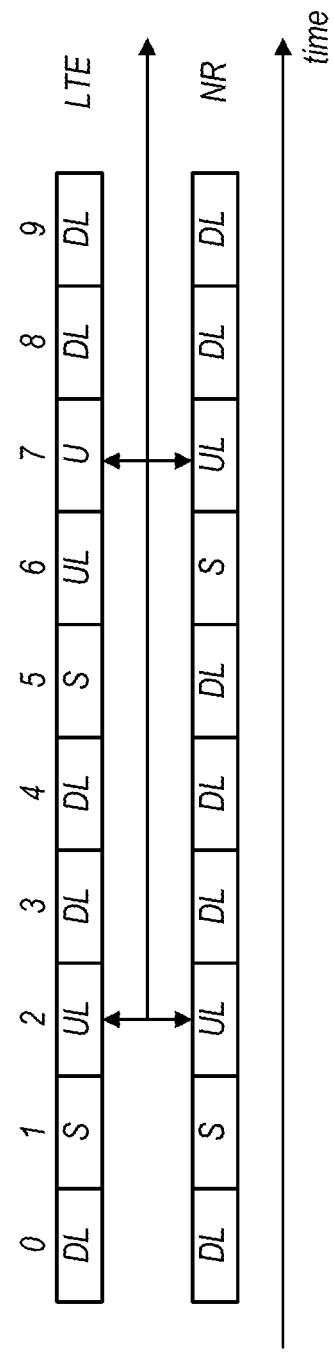
FIG. 9 illustrates an example sequence of subframes for LTE and NR operation, according to some embodiments.

FIG. 9 illustrates an exemplary TDD structure of subframes within a radio frame, e.g., LTE TDD configuration 2. As shown, the configuration includes uplink (UL), downlink (DL), and special (S) subframes. NR may follow the LTE TDD configuration. In some embodiments, however, as noted above, LTE and NR may not transmit at the same time, e.g., due to hardware limitations of the UE. In these embodiments, it may not be possible for the UL transmissions of SFs 2 and 7 to occur on both RATs at the same time. Accordingly, in order to accommodate UL transmissions on both RATs, the TDD structure may be adjusted. For example, SF 2 may be used for LTE UL, and SF 7 may be used for NR UL, or vice versa. Alternatively, in some embodiments one or more SFs may be shared between the RATs, e.g., special SFs 1 and/or 6 may carry some UL transmissions for each RAT. Similarly, the UL SFs may similarly be subdivided. UL transmissions may serve many purposes, including carrying ACK/NACK messages for DL operations and carrying uplink data.

Figure 10:
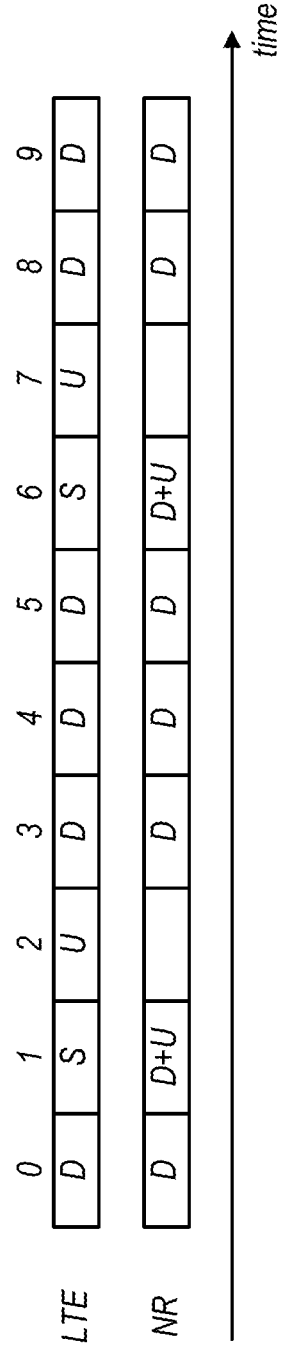
FIG. 10 illustrates an example sequence of subframes for LTE and NR operation, illustrating use of a special subframe for NR uplink activity, according to some embodiments.
Figure 11:
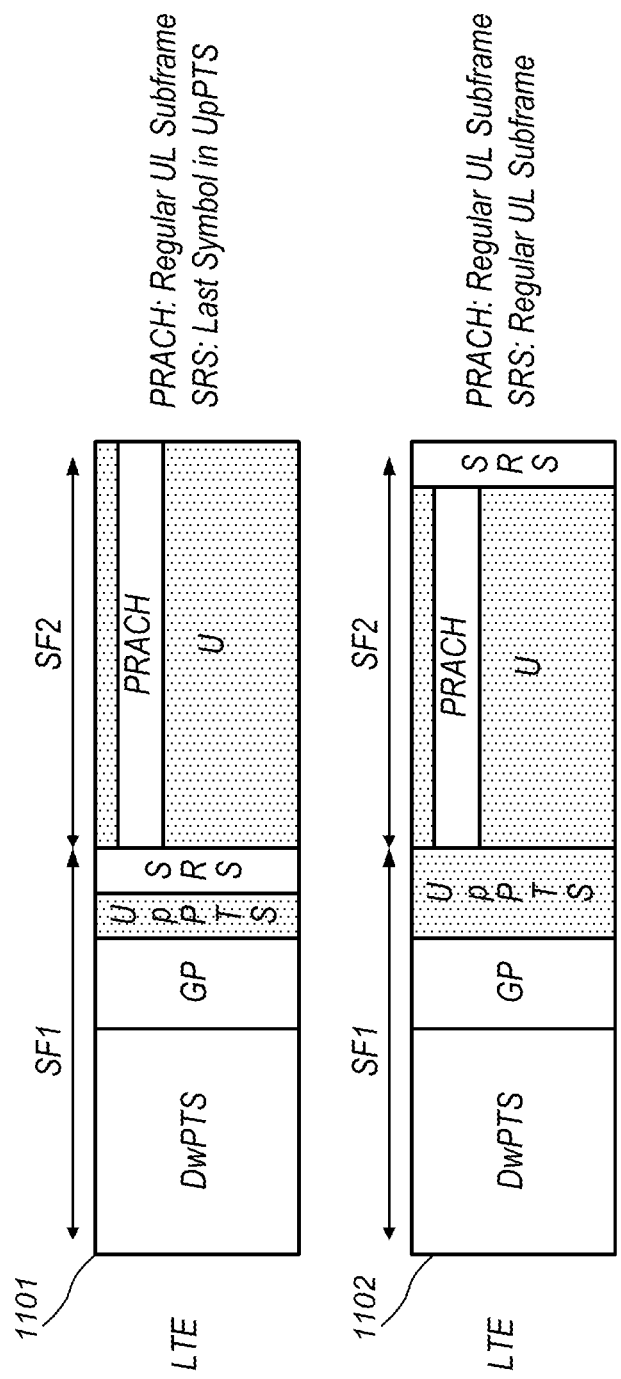
FIG. 11 illustrates an example configuration of LTE special and uplink subframes to allow for NR uplink activity during the special subframe, according to some embodiments.

FIG. 10 illustrates a TDD structure, wherein NR uplink (e.g., and possibly DL) communications may occur during an LTE special SF. As shown, the LTE TDD structure (e.g., TDD configuration 2, as illustrated in FIG. 9) may include special SFs 1 and 6, UL SFs 2 and 7, and DL in the remaining SFs. The TDD structure for NR may include no activity in SFs 2 and 7, a combination of DL and UL activity in SFs 1 and 6, and DL activity in the remaining SFs. Thus, in the embodiment shown, both RATs may perform DL activities at the same times (e.g., remaining SFs 0, 3-5, 8, and 9). Further, the two RATs do not perform UL activities at the same time, e.g., NR performs no UL activity during the LTE UL SFs 2 and 7. The activity of the two RATs during LTE special SFs 1 and 6 may be coordinated so that UL activity of the two RATs does not coincide, e.g., as shown in FIG. 11 and described below. For example, a network element such as a scheduler may allocate regular UL subframe to LTE, and allocate UpPTS and/or some of the GAP (e.g., guard period) to NR.

FIG. 11 illustrates two different structures of two LTE subframes (e.g., special SF 1 and UL SF2, e.g., as in FIG. 10) that may allow for NR UL transmissions during a portion of SF 1 (e.g., indicated by shading). In the first (upper) example (1101), the UpPTS of SF 1 may include transmission of the SRS (e.g., on LTE). Thus, the remaining (e.g., prior to the SRS) portion of the UpPTS may be available for NR UL transmission, e.g., no LTE UL transmissions occur during this portion. Further, the portions of SF 2 other than the PRACH may be available for NR UL transmissions, e.g., indicated by shading. In the second (lower) example (1102), the UpPTS of SF 1 may not include transmission of the SRS, e.g., the SRS may be moved to the SF 2. Thus, the entire UpPTS may be available for NR UL transmission. Further, the portions of SF 2 other than the PRACH and SRS may be available for NR UL transmissions, e.g., indicated by shading.

Figure 12:
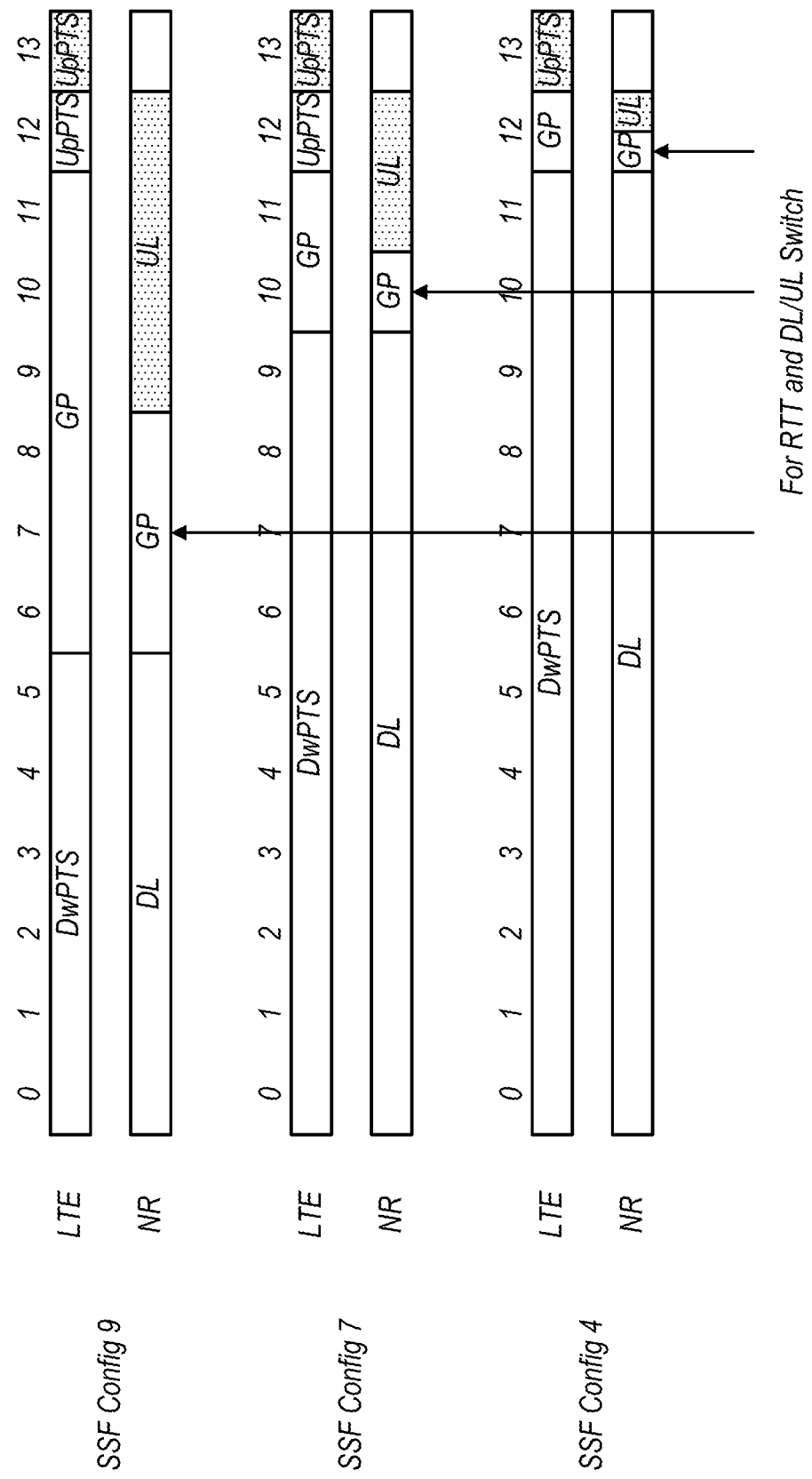
FIG. 12 illustrates example configurations of special subframes and NR uplink activity, according to some embodiments.

FIG. 12 illustrates three different configurations of a special subframe (e.g., special subframe (SSF) configurations 9, 7, and 4, each including 14 symbols). In the first example (e.g., SSF config 9), no LTE UL transmissions may occur during symbols 9-12, e.g., no transmissions may occur during a GP and the UpPTS may occur during symbol 13 (e.g., as in the first example, 1101, of FIG. 11). Note that the UpPTS may be may be scheduled so that UpPTS transmissions occur in symbol 13 but not during symbol 12. Thus, symbols 9-12 may be used for NR UL transmissions. In the second example (e.g., SSF config 7), no LTE UL transmissions may occur during symbols 11 and 12 (e.g., of the GP and UpPTS, respectively), and these symbols may be used for NR UL. In the third example (e.g., SSF Config 4), only the second half of symbol 12 may be available for NR UL (e.g., some GP may be needed, and may be scheduled for the first half of symbol 12; GP may be used to allow for physical layer round trip time (RTT) and to switch from DL to UL). In some embodiments, NR symbols may be shorter in duration (e.g., half) than LTE symbols, therefore this second half of symbol 12 may be used for NR UL transmission.

FIG. 13 includes a table of messages that may be used to configure TDD timing, according to some embodiments, e.g., of possible messages used to indicate a TDM schedule. As shown, a SIB1 message may include an information element (IE) for SF assignment, and may be used to configure UL HARQ time lines. An RRC message may include an IE to designate a HARQ configuration and may be used to configure DL HARQ time lines. The RRC message's IE may indicate times (e.g., a subset of available UL SFs) as UL SFs for HARQ operations, e.g. may be the same as or similar to IEs used in eIMTA. The RRC message's IE may indicate UL SFs for any UL activity. An L1 configuration message may include a downlink control information (DCI) IE, and may be used for dedicated transmission, etc.

Figure 14:
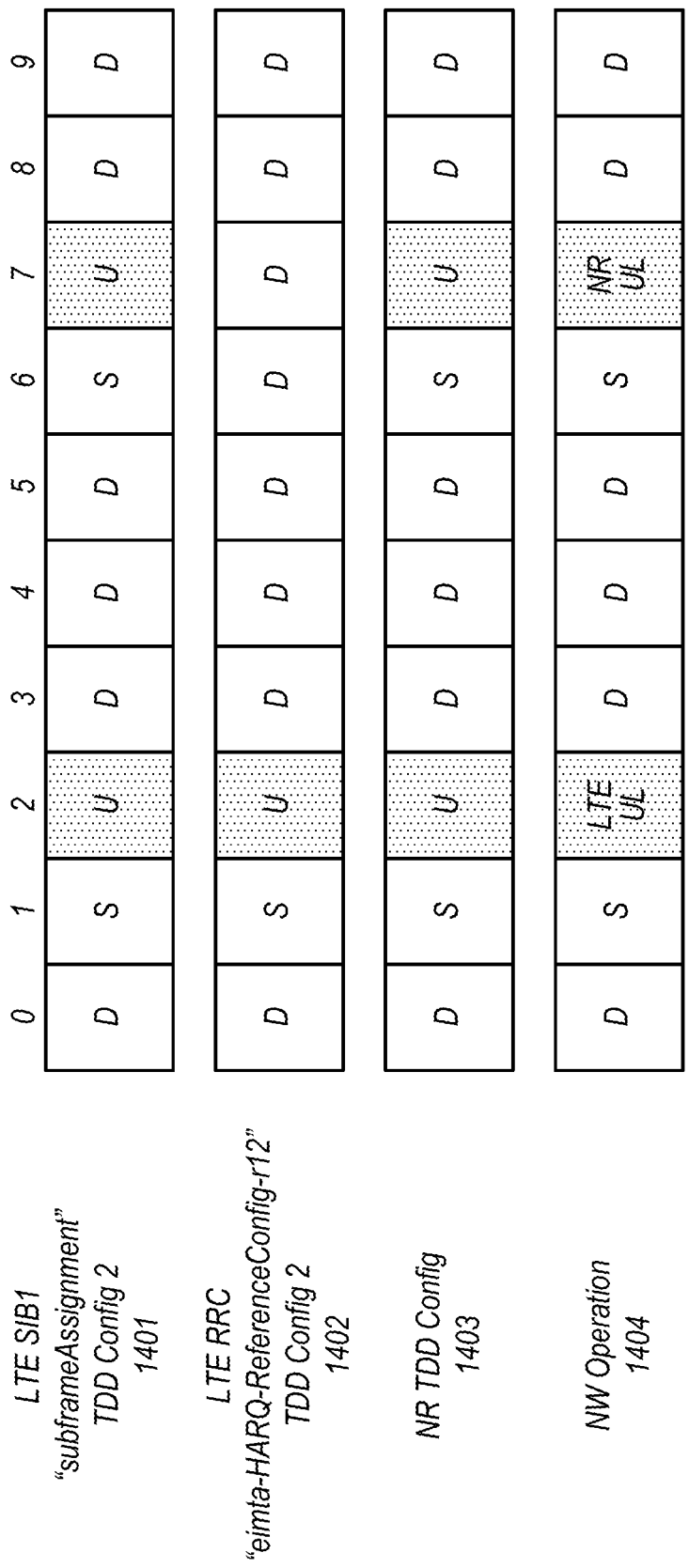
FIG. 14 illustrates an example reconfiguration of subframes for a TDD schedule for EN-DC, according to some embodiments.

FIG. 14 illustrates a possible subframe configuration and modification to incorporate NR UL activity, according to some embodiments. The network may initially operate in an LTE TDD configuration 2 subframe pattern (e.g. as shown in the first row (1401)). This configuration may be based on a SIM message, including a subframe assignment. In order to allow for a TDM schedule including NR UL transmissions, the network may send an RRC message, e.g., containing an eIMTA HARQ-ReferenceConfig-r12 information element (IE) (1402). The RRC message may reconfigure the UE to use LTE TDD configuration 5 for its LTE operations (e.g., as shown in the second row). This reconfiguration may make SF 7 available (e.g., because LTE UL operations will no longer be scheduled in that SF). The network may refrain from scheduling LTE DL operations during SF 7. In other words, SF 7 may be reallocated from LTE UL to LTE DL, and then made available for (e.g., ultimately reallocated to) NR UL. Thus, the network may refrain from scheduling any LTE operations (UL and/or DL) during the reconfigured SF (e.g., SF 7) in order to make SF 7 available for NR UL activity. LTE UL activity (e.g., a reference signal and/or a random access transmission, among various possibilities) that would have been scheduled during SF 7 (e.g., in accordance with LTE TDD configuration 2) may thus be scheduled in a different subframe. In some embodiments, the RRC message may contain an IE that is not an eIMTA IE, but uses an eIMTA configuration. The network may further configure NR TDD operations (e.g., as shown in the third row (1403)). Notably, no NR operations may be scheduled in SF 2 and NR UL operations may be scheduled in SF 7. Thus, the network (NW) may operate as shown in the fourth row (1404), e.g., one UL SF (SF 2) is used for LTE UL, and a second (SF 7) is used for NR UL. The resulting TDD configuration for network operation may be repeated in one or more subsequent frames, or a different TDD configuration may be used.

Figure 15:
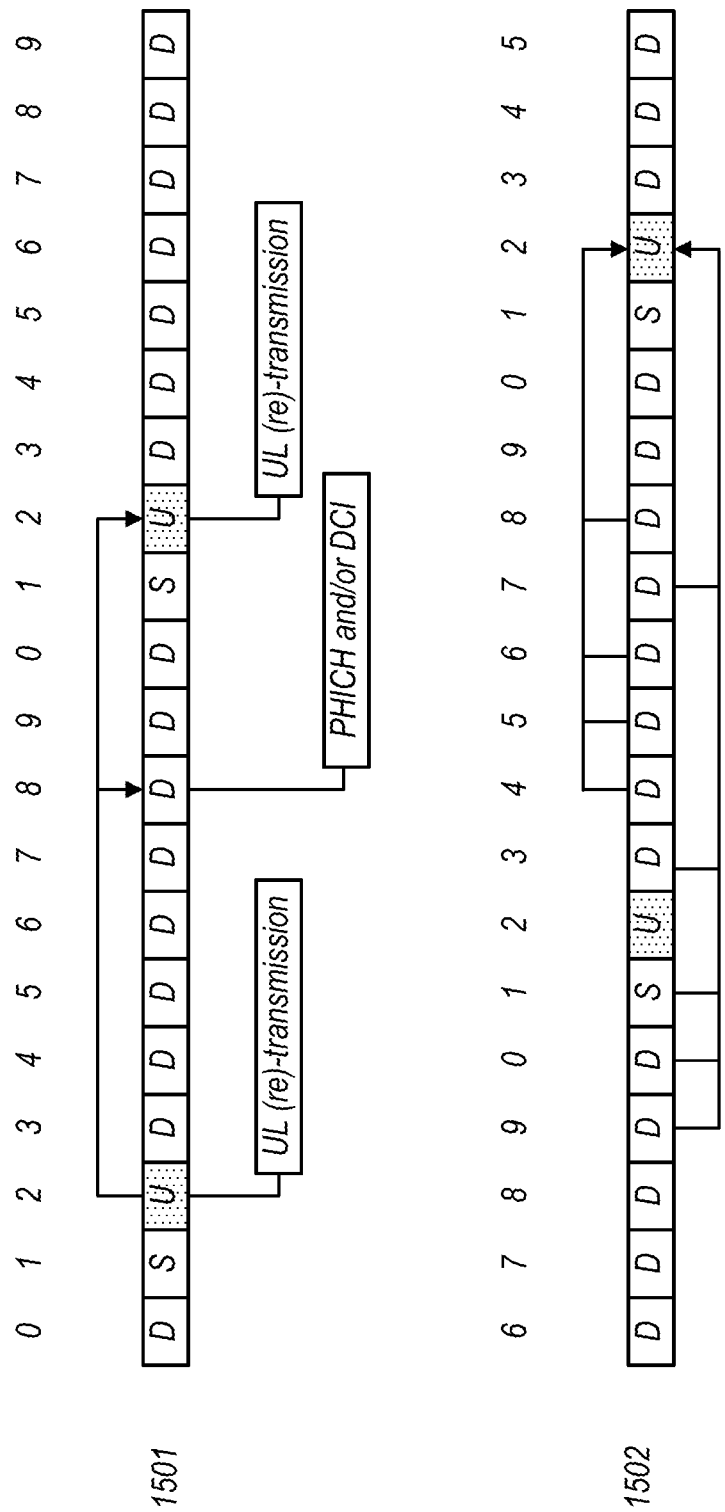
FIG. 15 illustrates example hybrid automatic repeat request (HARQ) timelines, according to some embodiments.

FIG. 15 illustrates LTE HARQ timelines, e.g., according to the subframe configuration of FIG. 14. The first (upper) timeline (1501) illustrates a HARQ UL timeline, e.g., as indicated in the TDD configuration in a SIB1 subframeAssignment. LTE UL transmissions occur in SF 2, HARQ ACK/NACK feedback (e.g., Physical HARQ Indicator Channel (PHICH)) and/or DCI. Any retransmissions (e.g., due to a NACK) may occur in SF 2 of the following frame. Thus, the UL HARQ timeline may include PUSCH (re-) transmission scheduling and ACK/NACK feedback. The second (lower) timeline (1502) illustrates a HARQ DL timeline, e.g., as indicated in an RRC configuration (eimta-HARQ-ReferenceConfigr12). LTE DL HARQ ACK/NACK occur in SF 2 (e.g., and not SF 7), and any resulting DL retransmissions may occur in the DL subframes. Thus, the DL HARQ timeline may include ACK/NACK feedback, e.g., based on the RRC configuration.

FIG. 16 illustrates a first type of exemplary HARQ timing adjustment, according to some embodiments. The timing adjustment may modify the delay between a NACK (e.g., in response to a UL transmission) and a retransmission (e.g., of the UL transmission) and/or between a DL transmission and HARQ feedback (e.g., an UL transmission of an ACK/NACK), and in particular may result in a retransmission occurring in the same SF (e.g., in a later frame) as the original transmission (e.g., associated with the NACK. The upper portion (1601) of the table describes the delay, e.g., in ms, between a UL NACK and the retransmission (e.g., DCI to PUSCH) and between a UL SF and the resulting ACK/NACK (e.g., PUSCH to PHICH). The lower portion (1602) shows potential modifications (e.g., Mod 1-3) to the delay between a UL NACK and the retransmission (e.g., DCI to PUSCH). The modified delay may be used instead of the delay (e.g., DCI to PUSCH) shown in the upper portion of the table. For example, using Mod 1, a NACK may be transmitted/received in SF 0 for a UL transmission in SF 4 of the previous frame. The modified delay may lead to a retransmission in SF 4 of the current frame (e.g., 4 ms later, instead of in SF 7). Note that Mod 3 may be very similar to Mod 1, but may result in an additional 10 ms (e.g., 1 frame) delay between the original transmission and the retransmission. Note that Mod 1-3 are exemplary solutions, and that other modifications are possible. Adjustments similar to those shown may be applicable to LTE TDD configurations 0 and 6, among various possibilities. Moreover, in any case that adjustments to the TDM schedule (e.g., including use of all or part of an LTE special SF for NR UL transmissions) reduce the (e.g., LTE) UL subframes available for HARQ ACK/NACK feedback, the UE (e.g., in coordination with the network) may adjust the delay between a DL transmission (e.g., PDSCH) and HARQ feedback (e.g., PUCCH).

Figure 17:
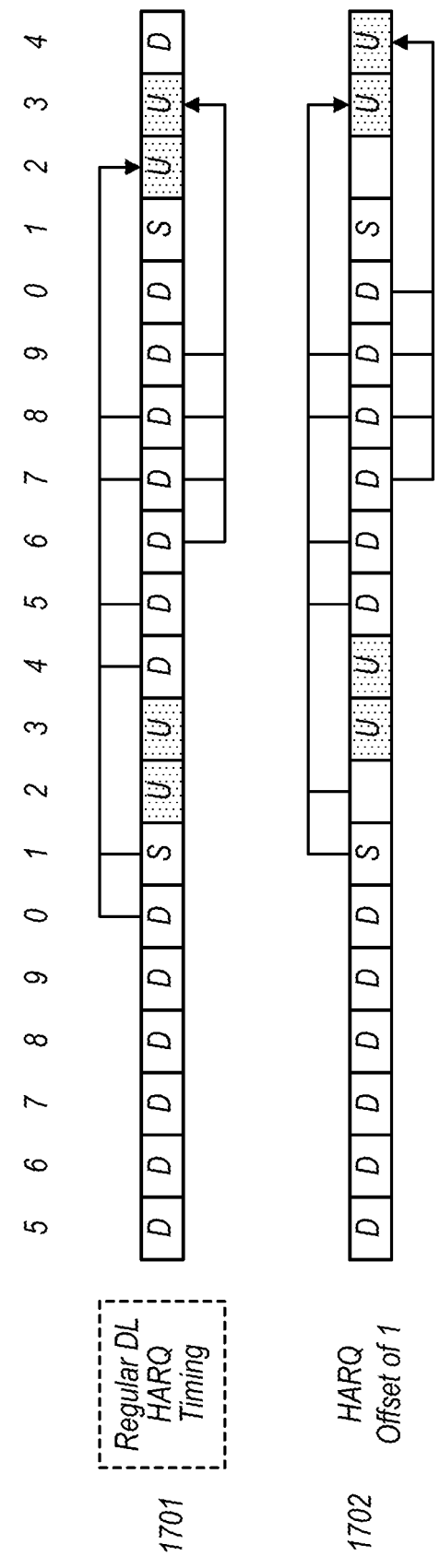
FIG. 17 illustrates example HARQ offsets, according to some embodiments.

FIG. 17 illustrates operation of a second type of HARQ timing adjustment, e.g., a HARQ offset, according to some embodiments. In some embodiments, the HARQ offset may be applied to offset the entire HARQ pattern/schedule, e.g., by a number of subframes equal to the offset. As shown, in the "regular" (e.g., non-offset) DL HARQ timing (1701), HARQ ACK/NACKs for (e.g., in response to) a first group of DL transmissions (e.g., the transmissions in DL SFs 0, 4, and 5 as well as special SF 1) of a first frame may be transmitted in subframe 2 of a second frame. Similarly, ACK/NACKs for a second group (e.g., DL SFs 6-9) of the first frame may be transmitted in UL SF 3 of the second frame. A HARQ offset of 1 may be applied to make SF 2 available, e.g., for NR UL transmissions (1702). The offset may act to offset both the SFs for which the ACK/NACKs apply, and the SF in which the ACK/NACKs are transmitted. In other words, the first group of DL transmissions may be SFs 1, 2, 5, and 6 and the second group may be SFs 7-9 of the first frame and SF 0 of the second frame. The ACK/NACKs may be transmitted in SFs 3 and 4 (e.g., of the second frame) instead of SFs 2 and 3. SF 4 may be converted from an LTE DL SF to an LTE UL SF, e.g., in order to transmit the offset ACK/NACKs. In the illustrated example, using the mathematical notation described above, 'm' may correspond to SF 6, 'n' may correspond to SF 3, m+HARQ_offset may be SF 7, and n+HARQ_offset may be SF 4. Note that other offsets may be used and that offsets may be applied to other subframe configurations.

In the following, various embodiments are described.

In some embodiments, a method may comprise: by a network element: establishing a first wireless link with a wireless device according to a first radio access technology (RAT); establishing a second wireless link with the wireless device according to a second RAT; determining a time division duplexing (TDD) schedule for uplink activity of the wireless device, wherein the schedule comprises uplink activity on the first RAT at a first time and uplink activity on the second RAT at a second time; transmitting an indication of the schedule to the wireless device; and receiving uplink activity on the first RAT and the second RAT according to the schedule.

In some embodiments, the first RAT is long-term evolution (LTE), wherein the second RAT is 5G-New Radio (NR).

In some embodiments, the first time comprises an uplink subframe, wherein the second time comprises a first portion of a special subframe.

In some embodiments, the first portion comprises a portion of a guard period (GP).

In some embodiments, the first portion comprises a portion of an uplink pilot time slot (UpPTS).

In some embodiments, the indication comprises a configuration of at least one of a sounding reference signal (SRS) or Physical Random Access Channel (PRACH).

In some embodiments, the first time comprises a first uplink subframe, wherein the second time comprises a second uplink subframe.

In some embodiments, the indication comprises a system information block (SIB) 1 message.

In some embodiments, the indication comprises a radio resource control (RRC) message, wherein the RRC message comprises an Information Element (IE) that indicates a time for uplink activity of at least one RAT. Enhanced Interference Mitigation and Traffic Adaptation (EIMTA) configuration element.

In some embodiments, the method may further comprise: adjusting a hybrid automatic repeat request (HARQ) schedule.

In some embodiments, said adjusting may comprise modifying a delay between a downlink transmission and HARQ feedback and/or between a HARQ negative acknowledgement and a retransmission.

In some embodiments, said adjusting may comprise offsetting the HARQ schedule.

In some embodiments, an apparatus, may comprise a processing element, and may be configured to a cause a base station to: determine a time division multiplexing (TDM) schedule for a wireless device, wherein the TDM schedule for the wireless device includes uplink activity on a first radio access technology (RAT) and uplink activity on a second RAT; indicate the TDM schedule to the wireless device; and communicate with the wireless device according to the TDM schedule.

In some embodiments, the uplink activity on the first RAT and the uplink activity of the second RAT occur at separate times.

In some embodiments, the TDM schedule comprises a reallocation of a first activity on the first RAT from first time to a second time, wherein the TDM schedule comprises uplink activity on the second RAT at the first time.

In some embodiments, the first activity comprises transmission of a reference signal and/or a random access transmission, wherein the first time comprises at least a portion of an uplink pilot time slot (UpPTS).

In some embodiments, to indicate the TDM schedule, the apparatus may be further configured to transmit a message to the wireless device, wherein the message reconfigures a previous TDM schedule of the wireless device.

In some embodiments, an apparatus may comprise a processing element, configured to a cause a base station to: establish first and second wireless links with a user equipment device (UE), wherein the first wireless link uses a first radio access technology (RAT) and the second wireless link uses a second RAT; adjust a first schedule of the first wireless link to create a modified schedule of the first wireless link, wherein the modified schedule comprises a first time for uplink transmissions on the first wireless link, wherein the modified schedule further comprises a second time, wherein the second time is available for uplink transmissions on the second wireless link; and communicate with the UE according to the modified schedule.

In some embodiments, the first schedule is an LTE specified time division duplexing (TDD) schedule.

In some embodiments, the modified schedule comprises a modified hybrid automatic repeat request (HARD) schedule.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor, wherein the processor is configured to a cause a user equipment (UE), capable of communicating using multiple wireless radio access technologies (RATs) including a first wireless link using a first RAT and a second wireless link using a second RAT, to:
receive a modified schedule of the first wireless link based on an adjustment of a first schedule, wherein the first schedule includes a configuration of one or more subframes denoted as uplink subframes, one or more subframes denoted as downlink subframes, and one or more subframes denoted as special subframes associated with the first RAT, wherein a subframe denoted as a special subframe associated with the first RAT includes respective portions denoted as downlink and uplink, wherein the modified schedule includes a first time interval for uplink transmissions on the first wireless link, wherein the modified schedule further includes a second time interval for uplink transmissions on the second wireless link, wherein the first time interval excludes the one or more subframes denoted as special subframes; and
communicate with a network element according to the modified schedule.

2. The apparatus of claim 1, wherein the adjustment of a first schedule includes applying a hybrid automatic repeats request (HARQ) offset, wherein said applying includes shifting the position of the uplink subframes of the first schedule by the HARQ offset.

3. The apparatus of claim 1, wherein the adjustment of the first schedule includes changing at least one subframe of the first schedule from an uplink subframe to a downlink subframe, wherein the at least one subframe is the second time interval.

4. The apparatus of claim 1, wherein the first schedule is long-term evolution (LTE) specified time division duplexing (TDD) schedule.

5. The apparatus of claim 1, wherein the modified schedule comprises a modified hybrid automatic repeat request (HARQ) schedule including a modified delay between a downlink transmission on the first wireless link and HARQ feedback on the first wireless link and/or between a HARQ negative acknowledgement on the first wireless link and a retransmission on the first wireless link.

6. The apparatus of claim 1, wherein the first RAT is long-term evolution (LTE), wherein the second RAT is 5G-New Radio (NR).

7. The apparatus of claim 1, wherein the first schedule is received via a system information block.

8. An user equipment device (UE), comprising:
a radio; and
a processor, wherein the processor is configured to a cause the UE to:
communicate using multiple wireless radio access technologies (RATs) including a first wireless link using a first RAT and a second wireless link using a second RAT;
receive a modified schedule of the first wireless link based on an adjustment of a first schedule, wherein the first schedule includes a configuration of one or more subframes denoted as uplink subframes, one or more subframes denoted as downlink subframes, and one or more subframes denoted as special subframes associated with the first RAT, wherein a subframe denoted as a special subframe associated with the first RAT includes respective portions denoted as downlink and uplink, wherein the modified schedule includes a first time interval for uplink transmissions on the first wireless link, wherein the modified schedule further includes a second time interval for uplink transmissions on the second wireless link, wherein the first time interval excludes the one or more subframes denoted as special subframes; and
communicate with a network element according to the modified schedule.

9. The UE of claim 8, wherein the adjustment of a first schedule includes applying a hybrid automatic repeats request (HARQ) offset, wherein said applying includes shifting the position of the uplink subframes of the first schedule by the HARQ offset.

10. The UE of claim 8, wherein the adjustment of the first schedule includes changing at least one subframe of the first schedule from an uplink subframe to a downlink subframe, wherein the at least one subframe is the second time interval.

11. The UE of claim 8, wherein the first schedule is long-term evolution (LTE) specified time division duplexing (TDD) schedule.

12. The UE of claim 8, wherein the modified schedule comprises a modified hybrid automatic repeat request (HARQ) schedule including a modified delay between a downlink transmission on the first wireless link and HARQ feedback on the first wireless link and/or between a HARQ negative acknowledgement on the first wireless link and a retransmission on the first wireless link.

13. The UE of claim 8, wherein the first RAT is long-term evolution (LTE), wherein the second RAT is 5G-New Radio (NR).

14. The UE of claim 8, wherein the first schedule is received via a system information block.

15. A method, comprising:
at a user equipment device (UE), capable of communicating using multiple wireless radio access technologies (RATs) including a first wireless link using a first RAT and a second wireless link using a second RAT:
receiving a modified schedule of the first wireless link based on an adjustment of a first schedule, wherein the first schedule includes a configuration of one or more subframes denoted as uplink subframes, one or more subframes denoted as downlink subframes, and one or more subframes denoted as special subframes associated with the first RAT, wherein a subframe denoted as a special subframe associated with the first RAT includes respective portions denoted as downlink and uplink, wherein the modified schedule includes a first time interval for uplink transmissions on the first wireless link, wherein the modified schedule further includes a second time interval for uplink transmissions on the second wireless link, wherein the first time interval excludes the one or more subframes denoted as special subframes; and communicating with a network element according to the modified schedule.

16. The method of claim 15, wherein the adjustment of a first schedule includes applying a hybrid automatic repeats request (HARQ) offset, wherein said applying includes shifting the position of the uplink subframes of the first schedule by the HARQ offset.

17. The method of claim 15, wherein the adjustment of the first schedule includes changing at least one subframe of the first schedule from an uplink subframe to a downlink subframe, wherein the at least one subframe is the second time interval.

18. The method of claim 15, wherein the first schedule is long-term evolution (LTE) specified time division duplexing (TDD) schedule.

19. The method of claim 15, wherein the modified schedule comprises a modified hybrid automatic repeat request (HARQ) schedule including a modified delay between a downlink transmission on the first wireless link and HARQ feedback on the first wireless link and/or between a HARQ negative acknowledgement on the first wireless link and a retransmission on the first wireless link.

20. The method of claim 15, wherein the first RAT is long-term evolution (LTE), wherein the second RAT is 5G-New Radio (NR).

* * * * *